(12) United States Patent
Qian et al.

(10) Patent No.: US 9,071,479 B2
(45) Date of Patent: Jun. 30, 2015

(54) HIGH-SPEED PARALLEL DECISION FEEDBACK EQUALIZER

(75) Inventors: Haoli Qian, Fremont, CA (US); Yat-tung Lam, Palo Alto, CA (US); Runsheng He, Sunnyvale, CA (US)

(73) Assignee: CREDO SEMICONDUCTOR (HONG KONG) LIMITED, Hong Kong (CN)

( * ) Notice: Subject to any disclaimer, the term of this patent is extended or adjusted under 35 U.S.C. 154(b) by 57 days.

(21) Appl. No.: 13/594,595

(22) Filed: Aug. 24, 2012

(65) Prior Publication Data
US 2014/0056346 A1  Feb. 27, 2014

(51) Int. Cl.
| | |
|---|---|
| H03H 7/30 | (2006.01) |
| H03H 7/40 | (2006.01) |
| H03K 5/159 | (2006.01) |
| H04L 25/03 | (2006.01) |
| H04B 10/69 | (2013.01) |

(52) U.S. Cl.
CPC . *H04L 25/03057* (2013.01); *H04L 2025/03356* (2013.01); *H04L 2025/03496* (2013.01); *H04B 10/6971* (2013.01)

(58) Field of Classification Search
CPC ...................................................... H04L 25/03
USPC .................................. 375/229, 233, 316, 324
See application file for complete search history.

(56) References Cited

U.S. PATENT DOCUMENTS

| | | | |
|---|---|---|---|
| 6,192,072 B1 * | 2/2001 | Azadet et al. ................. | 375/233 |
| 7,239,652 B2 | 7/2007 | Parhi | |
| 7,333,580 B2 | 2/2008 | Parhi | |
| 7,522,899 B1 | 4/2009 | He | |
| 7,577,892 B1 | 8/2009 | He | |
| 7,646,833 B1 | 1/2010 | He et al. | |
| 7,684,778 B1 | 3/2010 | Qian et al. | |
| 7,688,968 B1 | 3/2010 | Chen et al. | |
| 7,733,246 B2 | 6/2010 | Feng et al. | |
| 7,773,017 B1 | 8/2010 | He et al. | |
| 7,813,702 B1 | 10/2010 | He | |
| 7,826,576 B1 | 11/2010 | He et al. | |
| 7,853,855 B1 | 12/2010 | He | |
| 7,987,396 B1 | 7/2011 | Riani et al. | |
| 7,999,711 B1 | 8/2011 | He et al. | |
| 8,023,920 B1 | 9/2011 | Qian et al. | |
| 8,031,765 B1 | 10/2011 | He | |
| 8,059,773 B1 | 11/2011 | He et al. | |
| 8,077,859 B1 | 12/2011 | Xiaopeng et al. | |
| 8,175,565 B1 | 5/2012 | He | |
| 8,184,802 B1 | 5/2012 | Xiaopeng et al. | |

(Continued)

*Primary Examiner* — Freshteh N Aghdam
(74) *Attorney, Agent, or Firm* — Krueger Iselin LLP (57) ABSTRACT

A decision-feedback equalizer (DFE) can be operated at higher frequencies when parallelization and pre-computation techniques are employed. Disclosed herein is a DFE design suitable for equalizing receive signals with bit rates above 10 GHz, making it feasible to employ decision feedback equalization in silicon-based optical transceiver modules. One illustrative embodiment includes a front end filter to reduce leading intersymbol interference in a receive signal; a serial-to-parallel converter and at least one pre-compensation unit that together convert the filtered signal into grouped sets of tentative decisions, the sets in each group being made available in parallel; a set of pipelined DFE multiplexer units to select a contingent symbol decision from each set of tentative decisions to form groups of contingent symbol decisions based on a presumed sequence of preceding symbol decisions; and an output multiplexer that chooses, based on preceding symbol decisions, one of said groups of contingent symbol decisions.

23 Claims, 5 Drawing Sheets

(56) References Cited

U.S. PATENT DOCUMENTS

| | | |
|---|---|---|
| 8,203,975 B1 | 6/2012 | Chen et al. |
| 8,276,052 B1 | 9/2012 | Riani et al. |
| 8,301,036 B2 | 10/2012 | He |
| 2003/0108113 A1 | 6/2003 | He et al. |
| 2004/0196017 A1 | 10/2004 | Sutardja et al. |
| 2007/0063882 A1 | 3/2007 | Feng et al. |
| 2011/0069791 A1 | 3/2011 | He |
| 2011/0116806 A1* | 5/2011 | He .............................. 398/158 |
| 2012/0027074 A1 | 2/2012 | Raghavan et al. |

* cited by examiner

Fig. 8

HIGH-SPEED PARALLEL DECISION FEEDBACK EQUALIZER

BACKGROUND

Digital communications occur between sending and receiving devices over an intermediate communications medium, or "channel" (e.g., a fiber optic cable or insulated copper wires). Each sending device typically transmits symbols at a fixed symbol rate, while each receiving device detects a (potentially corrupted) sequence of symbols and attempts to reconstruct the transmitted data. A "symbol" is a state or significant condition of the channel that persists for a fixed period of time, called a "symbol interval." A symbol may be, for example, an electrical voltage or current level, an optical power level, a phase value, or a particular frequency or wavelength. A change from one channel state to another is called a symbol transition. Each symbol may represent (i.e., encode) one or more binary bits of the data. Alternatively, the data may be represented by symbol transitions, or by a sequence of two or more symbols.

The simplest digital communication links use only one bit per symbol; a binary '0' is represented by one symbol (e.g., an electrical voltage or current signal within a first range), and a binary '1' by another symbol (e.g., an electrical voltage or current signal within a second range). Channel non-idealities produce dispersion which may cause each symbol to perturb its neighboring symbols, causing intersymbol interference (ISI). ISI can make it difficult for the receiving device to determine which symbols were sent in each interval, particularly when such ISI is combined with additive noise.

To combat noise and ISI, receiving devices may employ various equalization techniques. Linear equalizers generally have to balance between reducing ISI and avoiding noise amplification. Decision Feedback Equalizers (DFE) are often preferred for their ability to combat ISI without inherently requiring noise amplification. As the name suggests, a DFE employs a feedback path to remove ISI effects derived from previously-decided symbols.

A standard textbook implementation of a DFE employs a number of cascaded circuit elements to generate the feedback signal and apply it to the received input signal, all of which must complete their operation in less than one symbol interval. At a symbol interval of 100 picoseconds (for a symbol rate of 10 Gbit/s), this implementation is infeasible with currently available silicon semiconductor processing technologies. Even data rates around a few gigabits per second can be difficult to achieve due to performance limitations of silicon-based integrated circuits.

SUMMARY

Accordingly, there are disclosed herein apparatus and methods employing parallelization and pre-computation techniques to implement decision feedback equalization (DFE) at bit rates above 10 Gbit/s, making it feasible to employ DFE in silicon-based optical transceiver modules. One illustrative embodiment includes a front end filter to reduce leading intersymbol interference in a receive signal; a serial-to-parallel converter and at least one pre-compensation unit that together convert the filtered signal into grouped sets of tentative decisions, the sets in each group being made available in parallel; a set of pipelined DFE multiplexer units to select a contingent symbol decision from each set of tentative decisions to form groups of contingent symbol decisions based on a presumed sequence of preceding symbol decisions; and an output multiplexer that chooses, based on preceding symbol decisions, one of said groups of contingent symbol decisions.

It should be understood, however, that the specific embodiments given in the drawings and detailed description do not limit the disclosure. On the contrary, they provide the foundation for one of ordinary skill to discern the alternative forms, equivalents, and modifications that are encompassed in the scope of the appended claims.

DETAILED DESCRIPTION

Figure 1:
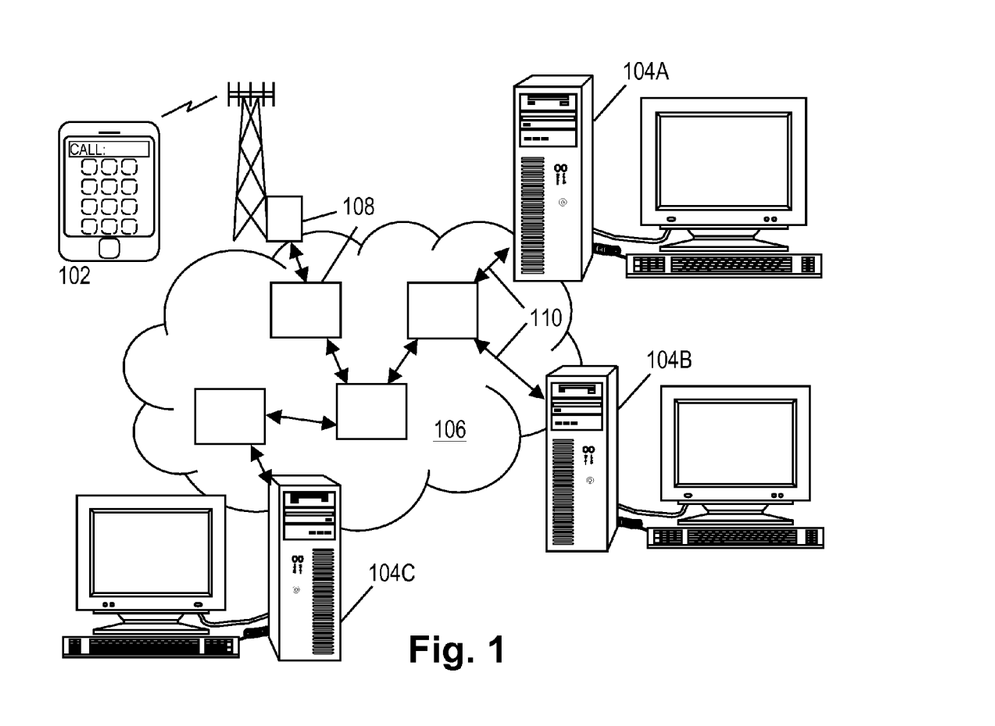
FIG. 1 shows an illustrative computer network.

The disclosed apparatus and methods are best understood in the context of the larger environments in which they operate. Accordingly, FIG. 1 shows an illustrative communications network 100 including mobile devices 102 and computer systems 104A-C coupled via a routing network 106. The routing network 106 may be or include, for example, the Internet, a wide area network, or a local area network. In FIG. 1, the routing network 106 includes a network of equipment items 108, such as switches, routers, and the like. The equipment items 108 are connected to one another, and to the computer systems 104A-C, via point-to-point communication links 110 that transport data between the various network components.

Figure 2:
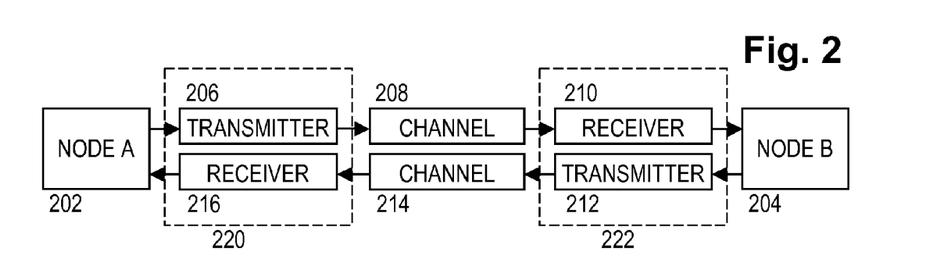
FIG. 2 is a function-block diagram of an illustrative point-to-point communication link.

FIG. 2 is a diagram of an illustrative point-to-point communication link that may be representative of links 110 in FIG. 1. The illustrated embodiment includes a first node 202 ("Node A") in communication with a second node 204 ("Node B"). Nodes A & B can each be, for example, any one of mobile devices 102, equipment items 108, computer systems 104A-C, or other sending/receiving devices suitable for high-rate digital data communications.

Coupled to Node A is a transceiver 220, and coupled to Node B is a transceiver 222. Communication channels 208 and 214 extend between the transceivers 220 and 222. The channels 208 and 214 may include, for example, transmission media such as fiber optic cables, twisted pair wires, coaxial cables, backplane transmission lines, and wireless communication links. (It is also possible for the channel to be a magnetic or optical information storage medium, with the write-read transducers serving as transmitters and receivers.) Bidirectional communication between Node A and Node B can be provided using separate channels 208 and 214, or in some embodiments, a single channel that transports signals in opposing directions without interference.

A transmitter 206 of the transceiver 220 receives data from Node A and transmits the data to the transceiver 222 via a signal on the channel 208. The signal may be, for example, an electrical voltage, an electrical current, an optical power level, a wavelength, a frequency, or a phase value. A receiver 210 of the transceiver 222 receives the signal via the channel 208, uses the signal to reconstruct the transmitted data, and provides the data to Node B. Similarly, a transmitter 212 of the transceiver 222 receives data from Node B, and transmits the data to the transceiver 220 via a signal on the channel 214. A receiver 216 of the transceiver 220 receives the signal via the channel 214, uses the signal to reconstruct the transmitted data, and provides the data to Node A.

Figure 3:
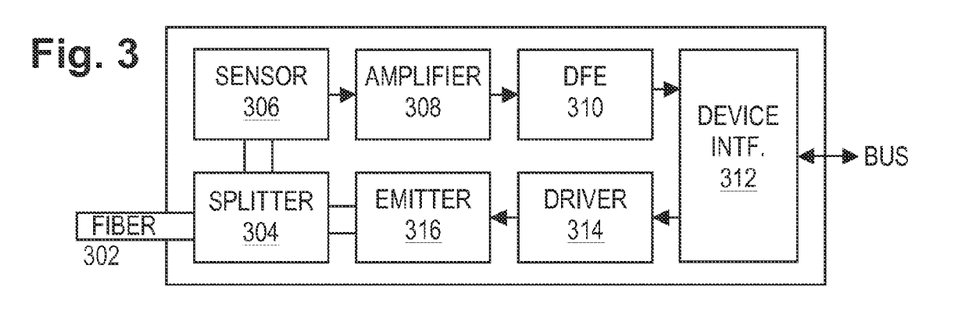
FIG. 3 is a function-block diagram of an illustrative fiber optic interface module.

FIG. 3 illustrates a transceiver embodiment specific to fiber optic signaling with a function block diagram of an illustrative fiber optic interface module. The optical fiber 302 couples to a splitter 304 which creates two optical paths to the fiber: one for receiving and one for transmitting. A sensor 306 is positioned on the receiving path to convert received optical signals into analog electrical signals that are amplified by amplifier 308 in preparation for processing by a decision feedback equalizer (DFE) 310. The DFE 310 reconstructs a digital data stream from the received signal. A device interface 312 buffers the received data stream and, in some embodiments, performs error correction and payload extraction to make the transmitted data available to the host node via an internal data bus in accordance with a standard I/O bus protocol.

Conversely, data for transmission can be communicated by the host node via the bus to device interface 312. In at least some embodiments, the device interface 312 packetizes the data with appropriate headers and end-of-frame markers, optionally adding a layer of error correction coding and/or a checksum. Driver 314 accepts a transmit data stream from interface 312 and converts the digital signals into an analog electrical drive signal for emitter 316, causing the emitter to generate optical signals that are coupled via splitter 304 to the optical fiber 302.

Figure 4:
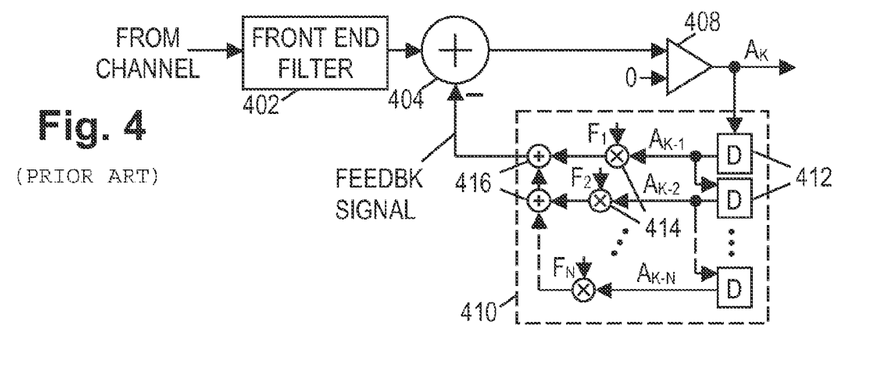
FIG. 4 shows an illustrative textbook decision feedback equalizer (DFE) implementation.

As previously mentioned, a DFE is included in the receive chain to combat intersymbol interference (ISI) that results from signal dispersion in the channel. FIG. 4 shows an illustrative "textbook" implementation of a DFE. In FIG. 4, an analog or digital front end filter 402 operates on the receive signal to shape the overall channel response of the system and minimize the effects of leading ISI on the current symbol. A summer 404 subtracts a feedback signal from the output of the front end filter 402 to minimize the effects of trailing ISI on the current symbol. The combined signal is then digitized to produce a stream of output data (denoted $A_k$, where k is the time index). In the illustrated example, the symbols are presumed to be bipolar (−1, +1), making the decision threshold 0 volts. A quantizer 408 produces a binary result: 0 if the output of summer 404 is below the threshold and 1 if the output is above the threshold. The DFE generates the feedback signal with a feedback filter 410 having a series of delay elements 412 (e.g., latches, flip flops, or registers) that store the recent output symbol decisions ($A_{k-1}$ . . . $A_{k-N}$, where N is the number of filter coefficients $f_i$). A series of multipliers 414 determines the product of each symbol with a corresponding filter coefficient, and a series of summers 416 combines the products to obtain the feedback signal.

As an aside, we note here that the circuitry for the front end filter 402 and the feedback filter 410 can operate on analog signals, or conversely, it can be implemented using digital circuit elements and/or software in a programmable processor. Further, the DFE can be readily extended from detecting binary symbols to M-ary symbols with the use of additional decision thresholds. Typically, a timing recovery unit and a filter coefficient adaptation unit augment the operation of the DFE, but such considerations are addressed in the literature and known to those skilled in the art, so we will not dwell on them here.

Figure 5:
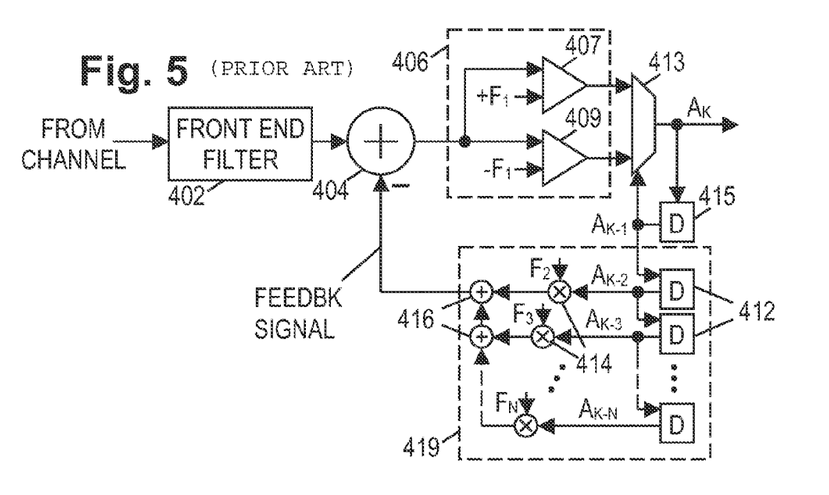
FIG. 5 shows an illustrative DFE employing a one-tap pre-computation unit.

In the embodiment of FIG. 4, the feedback filter 410 must complete its operation in less than one symbol interval because its current output depends in part upon the immediately preceding decision. At very high data rates, one symbol interval does not provide sufficient time to finish the filter multiplications and the feedback subtraction. Accordingly, one solution that has been proposed in the literature is "unrolling" the feedback filter. FIG. 5 shows an illustrative variation of FIG. 4 that unrolls the feedback filter by one tap. The embodiment of FIG. 5 employs the same front end filter 402, but summer 404 subtracts a feedback signal to remove the trailing ISI caused by all but the immediately preceding symbol. A pre-compensation unit 406 provides two paths. A quantizer 407 on the first path forms a tentative symbol decision assuming that the immediately preceding symbol was a "1", while a second quantizer 409 on the second path forms a tentative symbol decision assuming that the immediately preceding symbol was a "0" (corresponding to a −1 in a bipolar signaling scheme). As the trailing ISI from these symbols is different (+$f_1$ for a +1 symbol, and for a −1 symbol), the two paths provide different compensation for the ISI, either by using different decision thresholds as indicated in FIG. 5, or by biasing the signal paths by different amounts. A multiplexer 413 selects between the two tentative decisions based on the immediately preceding symbol decision $A_{k-1}$, which is stored by flip flop 415. Feedback filter 419 has a reduced number of taps (filter coefficients), but otherwise operates similarly to feedback filter 410.

Although this unrolling step increases the number of elements in the DFE loop (summer 404, precompensation unit 406, multiplexer 413, and feedback filter 419), only the multiplexer 413 and flip flop 415) need to achieve their operations in less than one symbol interval. The remaining loop elements can take up to two symbol intervals to operate. If it is still a challenge to complete the feedback filter operation in time, further unrolling can be performed.

Figure 6:
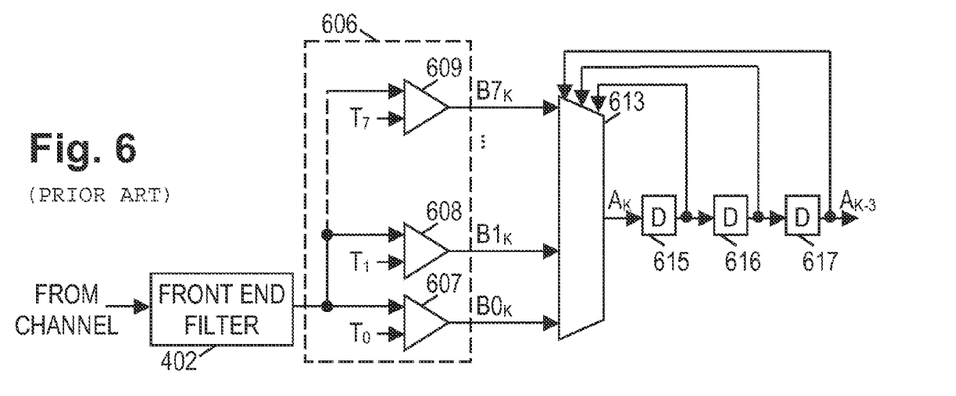
FIG. 6 shows an illustrative DFE with a fully-unrolled pre-computation unit.

FIG. 6 shows an illustrative variation in which a 3-tap feedback filter has been completely unrolled. This embodiment still employs front end filter 402, but the summer is eliminated since the feedback filter has been completely unrolled. Its function has been fully supplanted by precompensation unit 606, which provides a separate path for each combination of the three preceding symbols, e.g., 000, 001, 010, . . . , 111. The trailing ISI from each of these possible combinations is determined and removed (e.g., with a summer) or otherwise compensated for (e.g., using suitable decision thresholds for the quantizers on each path). Each path has a respective quantizer 607-609 that provides a tentative symbol decision subject to the presumed combination of preceding symbols. The set of eight tentative decisions is labeled in FIG. 6 as $B0_k$-$B7_k$, where k is again the time index. A multiplexer 613 selects from the set of tentative symbol decisions based on the preceding symbol decisions held in flip flops 615-617, producing the sequence of symbol decisions $A_k$.

Notably, such unrolling can address timing constraints on the feedback filter, but the operating time by flip flop 615 and multiplexer 613 may become the limiting factor at very high data rates. In other words, for any given semiconductor process, the propagation delay of the multiplexer becomes a bottleneck to the loop-unrolling approach as the data rate increases. FIGS. 7A-7D illustrate a novel DFE embodiment that employs a unique parallel architecture that can essentially be scaled as needed to fundamentally eliminate this feedback loop timing as a limiting factor on the data rate.

Figure 7A:
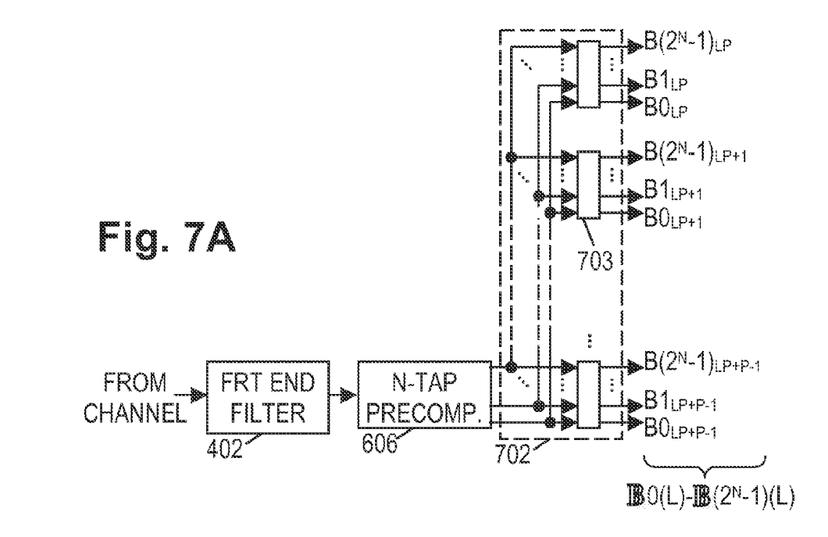
FIG. 7A shows an illustrative DFE front end that produces a parallel array of pre-computed signal sets.

FIG. 7A shows an illustrative DFE front end that produces a parallel array of pre-computed signal sets. FIG. 7A shows a front end filter 402 that, as before, shapes the overall channel response of the system and minimizes leading ISI. A precompensation unit 606 (for fully unrolling the feedback filter) derives a full set of tentative decisions $B0_k$-$B(2^N-1)_k$ for each symbol interval k (assuming binary symbols), where N is the number of the number of previous symbols causing trailing ISI. (FIG. 6 provides an example of a precompensation unit for a 3-symbol trailing ISI effect, but in practice the number of symbols may be larger or smaller.)

A serial to parallel converter 702 accepts the sequence of tentative decision sets and provides them in parallel as groups of P sets. (In the figures, open face lettering is used to represent a group of P signals, e.g., $\mathbb{B}$ 0(L) represents the group of signals $B0_{LP}$-$B0_{LP+P-1}$.) A set of registers 703 may latch in a round-robin fashion to capture each tentative decision set as it becomes available and to hold it for as long as necessary for subsequent processing, i.e., up to P symbol intervals. Other implementations of serial-to-parallel conversion units are known and can be used. Some implementations provide the captured set of tentative decisions as output upon capture, whereas others may store the captured sets to be output simultaneously as a whole group. The output of the serial to parallel converter corresponds to the input in FIGS. 7B-7D.

Figure 7B:
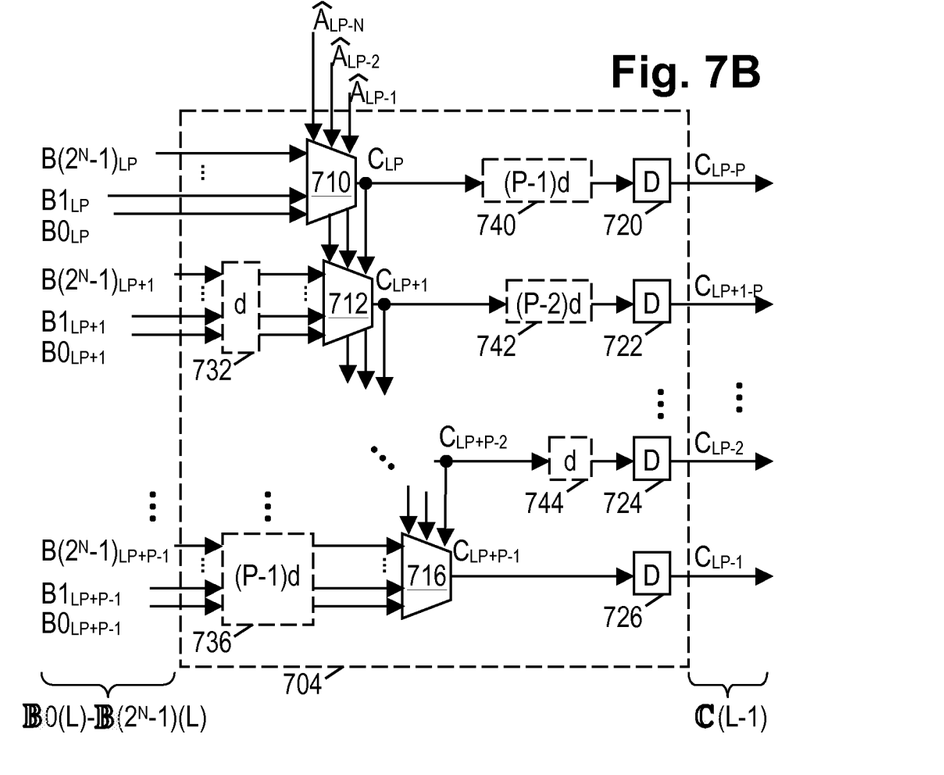
FIG. 7B shows an illustrative pipelined DFE multiplexer unit.

FIG. 7B shows an illustrative pipelined DFE multiplexer unit 704. Unit 704 selects one signal from each set of tentative decisions as a symbol decision, thereby producing P symbol decisions from P sets of tentative decisions. For each set of tentative decisions $B0_k$-$B(2^N-1)_k$, unit 704 employs a respective multiplexer 710, 712, . . . , 716 to forward a selected decision from each set. Where symbol decisions are available for the N preceding symbol intervals, the multiplexers make their selections based on those symbol decisions. For the beginning of each group, the N preceding symbol decisions are taken as inputs to the unit (denoted in the figure as $A_{LP-1}$ to $A_{LP-N}$). These inputs are shown in FIG. 7A as estimates for reasons explained further below.

A group of flip flops 720-726 latch the P symbol decisions and provide them as a group $C_{LP-P}$-$C_{LP-1}$ (also represented as $\mathbb{C}$ (L-1)). Due to the serial-to-parallel operation, each of the elements of unit 704 has up to P symbol intervals to perform each operation. FIG. 7B also shows an optional group of input delay elements 732-736 and an optional group of output delay elements 740-744. Such optional delay elements may be desirable to provide a consistent propagation delay along each of the P parallel paths through the unit 704 while also accounting for the delays required for the multiplexer outputs to cascade across the unit. Accordingly, the optional delay elements are shown incrementing or decrementing by d, the delay associated with the operation of each multiplexer.

Figure 7C:
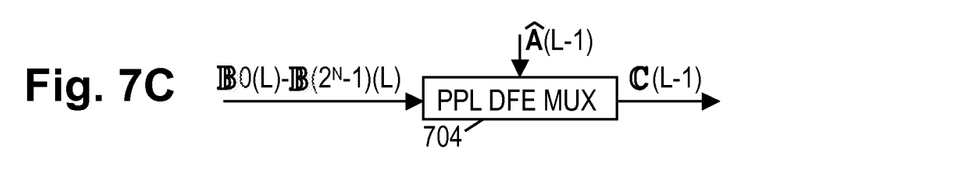
FIG. 7C shows a condensed representation of a pipelined DFE multiplexer unit.

FIG. 7C shows a condensed representation of a pipelined DFE multiplexer unit of FIG. 7B. As previously explained, the unit 704 makes a selection from each set of tentative decisions based on the preceding symbol decisions, thereby producing a group of symbol decisions, hereafter referred to as contingent symbol decisions for reasons that will become clear in the discussion of FIG. 7D.

Figure 7D:
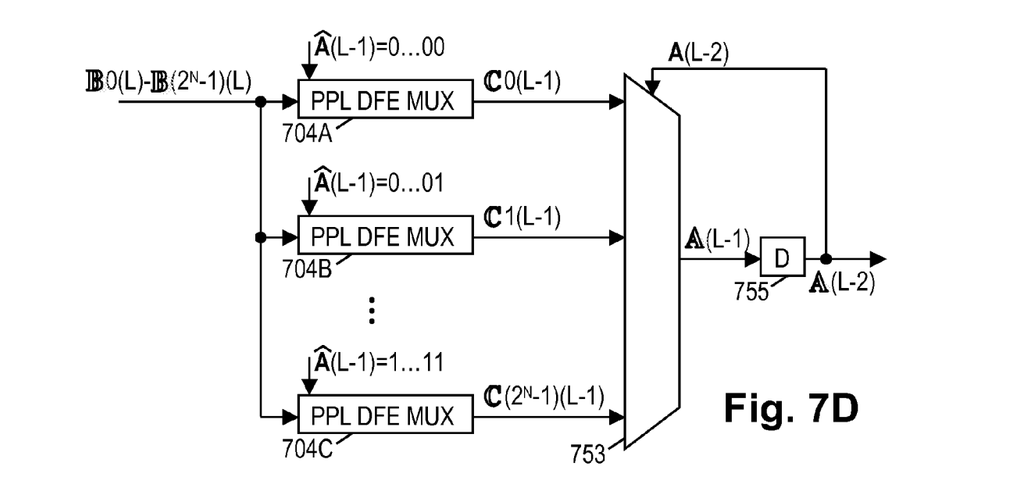
FIG. 7D shows an illustrative DFE back end having a parallel array of pipelined DFE multiplexer units.

FIG. 7D shows an illustrative DFE back end having a parallel array of $2^N$ pipelined DFE multiplexer units 704A-704C. The group of tentative decision sets from the DFE front end in FIG. 7A is distributed to all of the pipelined DFE multiplexer units for processing by each unit. Each unit operates on the group of tentative decision sets to provide a respective group of contingent symbol decisions (labeled in FIG. 7D as $\mathbb{C}$ 0(L-1)-$\mathbb{C}$ ($2^N$-1)(L-1)). Each pipelined DFE multiplexer unit presumes a different sequence of preceding symbol decisions. For example, unit 704A presumes that the preceding N symbol decisions are all zero, unit 704B presumes that the preceding N-1 symbol decisions are zero and the Nth preceding symbol decision is one, and so on through unit 704C which presumes the preceding symbol decisions are all ones.

Because the initial presumption is different for each unit, the group of contingent symbol decisions $\mathbb{C}$ n(L-1) should be expected to vary between units. A multiplexer 753 selects one group of contingent symbol decisions based on the N (actual) preceding symbol decisions A(L-2) stored in a latch 755. In FIG. 7D, the selected group of symbol decisions (labeled $\mathbb{A}$ (L-1)), is latched by latch 755, which holds the group of P symbols for up to P symbol intervals.

If the multiplexing operations employ 2-to-1 selectors, only N stages are needed for the multiplexing operations, meaning that the delay associated with multiplexer 753 is linear in N. (We focus on multiplexer 753 because this is the only portion of the circuit having a feedback loop. Everything else is implemented as a (possibly pipelined) feed forward arrangement.) This total mux delay must be kept smaller than the time interval PT, where P is the parallelization factor and T is the symbol interval. Since the parallelization factor P can be made as large as desired, the circuit designer is not prevented by an irreducible feedback loop delay from providing a circuit capable of handling an arbitrarily small symbol interval with arbitrarily slow devices (gates). Contrast this with the unrolled-loop DFE architecture where the mux delay must be safely smaller than the symbol interval, creating an insurmountable data rate limit for a given device (gate) speed.

Figure 8:
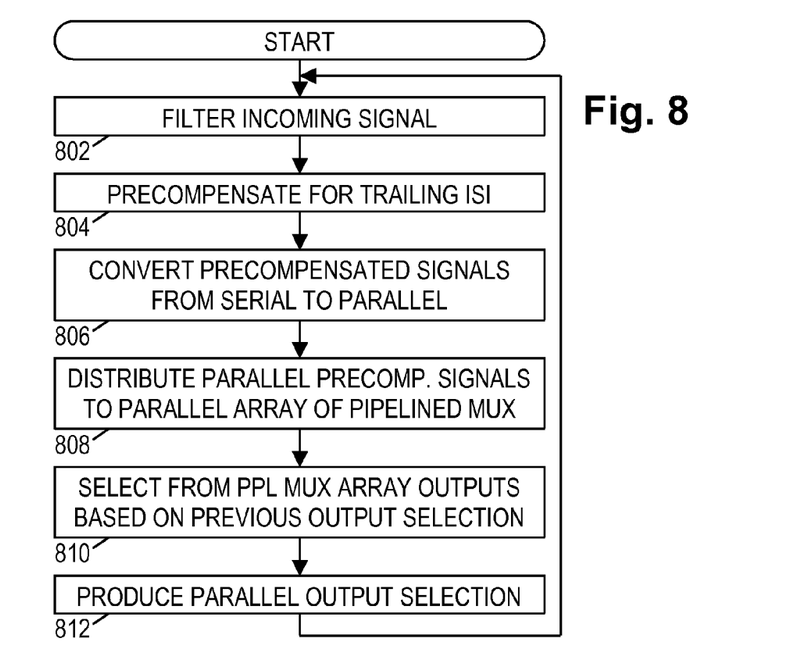
FIG. 8 is a flowchart of an illustrative equalization method for high speed receiving devices.

FIG. 8 is a flowchart of an illustrative DFE-based equalization method for use by high speed receiving devices. For explanatory purposes, the operations are shown and described in sequential order, but it is expected that the operations would typically be performed concurrently by different portions of the device. Nevertheless, a sequential implementation is possible and in some implementations may be preferred (e.g., by software on a programmable processor).

In block 802, the DFE filters the incoming signal with, e.g., a front end filter that shapes the overall channel response and minimizes leading ISI. In block 804, the DFE precompensates for trailing ISI, using multiple paths corresponding to the various amounts of trailing ISI from the different possible preceding symbol decisions. A tentative symbol decision is made on each path, yielding a set of $2^N$ tentative decisions. In block 806, the DFE takes P sequential sets of tentative decisions and provides them in parallel as a group. In block 808, the group of sets is distributed to each of $2^N$ pipelined DFE multiplexer units. Each of the DFE multiplexer units selects a tentative decision from each set, yielding a group of decision symbols contingent upon a presumed sequence of preceding decision symbols. The presumed sequence is different for each pipelined DFE multiplexer unit. In block 810, the DFE selects one group of contingent decision symbols based upon the actual sequence of preceding decision symbols. In block 812, the selected group is latched and output as a group of actual decision symbols.

Numerous alternative forms, equivalents, and modifications will become apparent to those skilled in the art once the above disclosure is fully appreciated. For example, the various DFE components can be implemented with analog electrical components or with digital electrical components. In many cases, the order of elements can be changed, e.g., performing the precompensation after the serial-to-parallel conversion, though this necessitates multiple precompensation units operating in parallel. The number of trailing ISI symbol intervals N can be 1, 2, 3, 4, or more. The parallelization factor P can be 2, 3, 4, 5, or more. The number of permissible symbol decisions may be binary or M-ary where M is usually a power of 2. It is intended that the claims be interpreted to embrace all such alternative forms, equivalents, and modifications that are encompassed in the scope of the appended claims.

What is claimed is:

1. A high speed equalization method that comprises:
deriving at each of multiple consecutive time intervals a set of tentative decisions, each tentative decision accounting for a respective degree of trailing intersymbol interference;
forming a parallel group from a series of said sets of tentative decisions;
applying the parallel group to a set of pipelined DFE multiplexer units, each said unit selecting a contingent symbol decision from each set of tentative decisions in the group to form a group of contingent symbol decisions based on a different presumed sequence of preceding symbol decisions; and
choosing, based on an actual sequence of preceding symbol decisions, one of said groups of contingent symbol decisions as a group of actual symbol decisions.

2. The method of claim 1, wherein said deriving includes:
minimizing leading intersymbol interference with a front end filter, thereby providing a filtered input signal; and
distributing the filtered input signal across a set of paths, each path compensating the filtered input signal for a respective degree of trailing intersymbol interference.

3. The method of claim 1, wherein the set of tentative decisions and the set of pipelined DFE multiplexer units each have a cardinality of $2^N$, where N is a number of preceding symbols causing trailing intersymbol interference.

4. The method of claim 1, wherein each group has a cardinality of P, wherein P is a finite integer parallelization factor at least equal to 2.

5. The method of claim 1, further comprising latching the group of actual symbol decisions.

6. The method of claim 1, further comprising applying N most recent actual symbol decisions to a multiplexer that performs said choosing, where N is a number of preceding symbols causing trailing intersymbol interference.

7. A high speed equalizer that comprises:
a front end filter that reduces leading intersymbol interference in a receive signal to provide a filtered signal;
a serial-to-parallel converter and at least one precompensation unit that together convert the filtered signal into grouped sets of tentative decisions, the sets in each group being made available in parallel;
a set of pipelined DFE multiplexer units, each multiplexer unit selecting a contingent symbol decision from each set of tentative decisions in each group to form groups of contingent symbol decisions based on a different presumed sequence of preceding symbol decisions; and
an output multiplexer that chooses, based on an actual sequence of preceding symbol decisions, one of said groups of contingent symbol decisions as a group of actual symbol decisions.

8. The equalizer of claim 7, further comprising an output latch that holds the actual symbol decisions for group interval delay.

9. The equalizer of claim 7, wherein the precompensation unit derives digital decisions from analog signals.

10. The equalizer of claim 9, wherein the precompensation unit outputs decisions at a rate in excess of 10 GHz.

11. The equalizer of claim 7, wherein the front end filter, serial-to-parallel converter, and precompensation unit are implemented with digital circuit elements.

12. The equalizer of claim 7, wherein the set of tentative decisions and the set of pipelined DFE multiplexer units each have a cardinality of $2^N$, where N is a number of preceding symbols causing trailing intersymbol interference, and wherein each group has a cardinality of P, wherein P is a finite integer parallelization factor at least equal to 2.

13. A channel interface module that comprises a receiver having:
a sensor that converts receive channel signals into electrical signals;
a front end filter that enhances the signal-to-noise ratio of the electrical signals;
at least one precompensation unit and a serial-to-parallel converter that together produce groups of tentative decision sets, the sets in each group being made available in parallel;
a set of multiplexer units that each operate on each group to obtain a group of contingent decisions based on a different presumed sequence of preceding symbol decisions;
an output multiplexer that, based on actual preceding symbol decisions, chooses a group of actual symbol decisions from the groups of contingent decisions; and
a device interface that provides a host node with a received data stream derived from the group of actual symbol decisions.

14. The module of claim 13, further comprising a transmitter that receives a transmit data stream from said device interface and converts said transmit data stream to a transmit channel signal.

15. The module of claim 14, wherein the received data stream carries at least 10 Gbit/s.

16. The module of claim 13, wherein the receiver further includes an output latch that holds the group of actual symbol decisions for group interval delay.

17. The module of claim 13, wherein the tentative decision sets and the set of multiplexer units each have a cardinality of $2^N$, where N is a number of preceding symbols causing trailing intersymbol interference.

18. The module of claim 13, wherein the output multiplexer employs N most recent actual symbol decisions from a preceding group of actual symbol decisions to perform said choosing, where N is a number of preceding symbols causing trailing intersymbol interference.

19. The module of claim 17, wherein each group has a cardinality of P, wherein P is finite integer parallelization factor at least equal to 2.

20. The module of claim 19, wherein P is greater than N.

21. The module of claim 13, wherein the transmit and receive channel signals are optical signals.

22. The module of claim 13, wherein the channel is an information storage medium.

23. The module of claim 13, wherein the transmit and receive channel signals are electromagnetic signals conveyed via twisted wire pair, coaxial cable, or backplane transmission lines.

* * * * *